United States Patent
Kim et al.

(10) Patent No.: US 10,346,988 B2
(45) Date of Patent: Jul. 9, 2019

(54) METHOD FOR GENERATING FOREGROUND USING MULTIPLE BACKGROUND MODELS AND APPARATUS THEREOF

(71) Applicants: SAMSUNG SDS CO., LTD., Seoul (KR); INDUSTRY-ACADEMIC COOPERATION FOUNDATION, YONSEI UNIVERSITY, Seoul (KR)

(72) Inventors: Bo Ram Kim, Seoul (KR); Dae Yong Park, Seoul (KR); Sun Hee Hwang, Seoul (KR); Min Song Ki, Seoul (KR); Kwang Yong Lim, Seoul (KR); Hye Ran Byun, Seoul (KR); Seung Jun Lee, Seoul (KR); Sung Woo Kim, Seoul (KR); Yoon Seong Kang, Seoul (KR)

(73) Assignees: SAMSUNG SDS CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 65 days.

(21) Appl. No.: 15/791,586

(22) Filed: Oct. 24, 2017

(65) Prior Publication Data

US 2018/0114324 A1 Apr. 26, 2018

(30) Foreign Application Priority Data

Oct. 24, 2016 (KR) .................. 10-2016-0138285

(51) Int. Cl.
*G06T 7/10* (2017.01)
*G06T 7/194* (2017.01)
(Continued)

(52) U.S. Cl.
CPC .............. *G06T 7/194* (2017.01); *G06T 5/50* (2013.01); *G06T 7/11* (2017.01); *G06T 2207/20221* (2013.01); *G06T 2207/20224* (2013.01)

(58) Field of Classification Search
CPC ... G06T 7/194; G06T 7/11; G06T 5/50; G06T 2207/20221; G06T 2207/20224
See application file for complete search history.

(56) References Cited

U.S. PATENT DOCUMENTS

| | | | |
|---|---|---|---|
| 5,515,109 A * | 5/1996 | Vlahos ................... | H04N 5/272 348/586 |
| 6,184,858 B1 * | 2/2001 | Christian .............. | G01S 3/7865 345/634 |

(Continued)

FOREIGN PATENT DOCUMENTS

KR 10-2008-0108864 A 12/2008

*Primary Examiner* — Manav Seth
(74) *Attorney, Agent, or Firm* — Sughrue Mion, PLLC (57) ABSTRACT

Provided is a method for generating a foreground in a foreground generating apparatus, the method including: extracting a plurality of foregrounds by applying a plurality of background models to an image, the plurality of background models having different ranges of a pixel variance value; generating an intersection foreground based on an intersection region among the extracted plurality of foregrounds; generating a union foreground based on a union region among the extracted plurality of foregrounds; and generating a final foreground based on the intersection foreground and the union foreground.

12 Claims, 7 Drawing Sheets

(51) Int. Cl.
*G06T 5/50* (2006.01)
*G06T 7/11* (2017.01)

(56) References Cited

U.S. PATENT DOCUMENTS

| | | | | |
|---|---|---|---|---|
| 6,570,608 B1 * | 5/2003 | Tserng | G06K 9/00335 | 348/143 |
| 6,766,059 B1 * | 7/2004 | Kondo | H04N 19/105 | 375/240.14 |
| 7,042,493 B2 * | 5/2006 | Prandoni | H04N 5/2625 | 348/157 |
| 7,120,297 B2 * | 10/2006 | Simard | G06K 9/00456 | 382/166 |
| 7,190,809 B2 * | 3/2007 | Gutta | G06K 9/00771 | 348/169 |
| 7,317,826 B2 * | 1/2008 | Wilensky | G06K 9/342 | 382/162 |
| 7,492,523 B2 * | 2/2009 | Dolgoff | G02B 27/2278 | 359/630 |
| 7,606,417 B2 * | 10/2009 | Steinberg | G06K 9/00248 | 382/173 |
| 7,630,543 B2 * | 12/2009 | Wilensky | G06K 9/342 | 382/162 |
| 7,660,463 B2 * | 2/2010 | Blake | G06K 9/00624 | 382/173 |
| 7,676,081 B2 * | 3/2010 | Blake | G06K 9/00234 | 358/538 |
| 7,720,283 B2 * | 5/2010 | Sun | G06K 9/38 | 382/173 |
| 7,809,167 B2 * | 10/2010 | Bell | G06F 3/0425 | 382/103 |
| 7,885,463 B2 * | 2/2011 | Zhang | G06K 9/38 | 382/173 |
| 8,086,050 B2 * | 12/2011 | Schwartz | G06T 7/194 | 345/555 |
| 8,228,436 B2 * | 7/2012 | Nakamura | H04N 5/275 | 348/578 |
| 8,463,065 B2 * | 6/2013 | Sun | G06T 5/20 | 382/260 |
| 8,538,150 B2 * | 9/2013 | Kim | G06K 9/38 | 382/103 |
| 8,781,253 B2 * | 7/2014 | Bhaskaranand | G06T 7/194 | 382/283 |
| 8,855,411 B2 * | 10/2014 | He | G06K 9/34 | 382/164 |
| 8,983,200 B2 * | 3/2015 | Feris | G06K 9/34 | 382/190 |
| 9,104,980 B2 * | 8/2015 | Noda | G06N 20/00 | |
| 9,147,259 B2 * | 9/2015 | Bobbitt | G06K 9/00771 | |
| 9,152,243 B2 * | 10/2015 | Gu | G06K 9/00208 | |
| 9,305,357 B2 * | 4/2016 | Yu | H04N 5/272 | |
| 9,311,719 B2 * | 4/2016 | Lee | G06T 7/194 | |
| 9,414,016 B2 * | 8/2016 | Lin | H04N 7/15 | |
| 9,437,012 B2 * | 9/2016 | Gefen | G06T 7/292 | |
| 9,741,130 B2 * | 8/2017 | Fan | G06T 7/74 | |
| 2017/0372498 A1 * | 12/2017 | Ding | G06T 7/11 | |

* cited by examiner

METHOD FOR GENERATING FOREGROUND USING MULTIPLE BACKGROUND MODELS AND APPARATUS THEREOF

CROSS-REFERENCE TO RELATED APPLICATION

This application claims priority from Korean Patent Application No. 10-2016-0138285 filed on Oct. 24, 2016 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for generating a foreground using a multiple background model and an apparatus thereof and, more particularly, to a method for generating a final foreground based on a plurality of foregrounds extracted by using a multiple background model and an apparatus thereof.

2. Description of the Related Art

In image analysis techniques, various methods for distinguishing a static background from a dynamic foreground have been provided. As one of representative methods, a Gaussian Mixture Model (GMM), which automatically learns the background and detects the foreground on a pixel-by-pixel basis, is widely used.

The Gaussian mixture model is insufficient to precisely extract a foreground from an image in various environments because it defines and learns only the characteristics of a background without separately considering the characteristics of an image to be processed. For example, the Gaussian mixture model extracts a foreground image in which a foreground region is excessively divided or partially lost, with respect to a camouflage region having properties similar to the learned background. Further, in the case of using the Gaussian mixture model, there may arise a problem that a region other than an actual foreground region is extracted as a foreground region when an image capturing device automatically adjusts brightness or when a change in illumination occurs.

Accordingly, there is a demand for a foreground extraction method using a multiple background model in which a plurality of different variance value ranges are applied respectively. Also, there is a demand for a method for precisely extracting a foreground by integrating a plurality of foregrounds extracted through a multiple background model into one foreground.

SUMMARY

Aspects of the present disclosure provide a method for extracting a foreground by using a multiple background model in which different variance value ranges are applied to one image.

More specifically, aspects of the present disclosure provide a method for extracting a foreground from which a background has been excluded even when there is a change in the external environment using a background model having a high variance value range while extracting, as a foreground, an object having a pixel value distribution similar to a background using a background model having a low variance value range, and an apparatus thereof.

Aspects of the present disclosure also provide a method for generating a final foreground based on an intersection foreground and a union foreground of foregrounds extracted by applying a multiple background model.

Aspects of the present disclosure also provide a method for generating a final foreground including spatially separated objects by checking the reliability for each region on the extracted foreground.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an exemplary embodiment, provided is a method for generating a foreground in a foreground generating apparatus, the method including: extracting a plurality of foregrounds by applying a plurality of background models to an image, the plurality of background models having different ranges of a pixel variance value; generating an intersection foreground based on a intersection region among the extracted plurality of foregrounds; generating a union foreground based on a union region among the extracted plurality of foregrounds; and generating a final foreground based on the intersection foreground and the union foreground.

The extracting the plurality of foregrounds may include extracting the plurality of foregrounds by applying, in parallel, the plurality of background models to the image.

The different ranges of the pixel variance value may include a first range of the pixel variance value and a second range of the pixel variance value, and a maximum variance value belonging to the first range of the pixel variance value may be smaller than a minimum variance value belonging to the second range of the pixel variance value.

The method may further include: receiving a setting number prior to extracting the plurality of foregrounds, the setting number being two or greater; generating the plurality of background models based on the setting number; and determining a range of the pixel variance value to be set for each of the generated plurality of background models.

The determining the range of the pixel variance value to be set for each of the generated plurality of background models may include: determining the range of the pixel variance value to be applied to each of the generated plurality of background models based on the setting number; obtaining a pixel variance value at a time point (t) by using a pixel value at the time point (t) and a pixel value average and a pixel variance value at a time point (t−1) for each pixel of the image; and determining the obtained pixel variance value as a pixel variance value of one of the plurality of background models in response to the obtained pixel variance value belonging to the range of the pixel variance value determined for the one of the plurality of background models.

The generating the final foreground may include: selecting a first pixel in a first region of the intersection foreground; and in response to detecting a second pixel having the same pixel value as a pixel value of the first pixel, among peripheral pixels of the first pixel in the union foreground, determining the first pixel and the second pixel as pixels of the final foreground.

The method may further include: in response to detecting a third pixel having the same pixel value as a pixel value of the second pixel, among peripheral pixels of the second pixel in the union foreground, determining the third pixel as a pixel of the final foreground.

The method may further include: selecting a fourth pixel in a second region of the intersection foreground; and in response to detecting a fifth pixel having the same pixel value as a pixel value of the fourth pixel, among peripheral pixels of the fourth pixel in the union foreground, determining the fourth pixel and the fifth pixel as pixels of the final foreground.

The extracting the plurality of foregrounds may include extracting a first foreground and a second foreground, and the generating the intersection foreground may include: determining first regions being spatially continuous and having the same pixel value in the first foreground, a number of the first regions being equal to or greater than a predetermined number; determining second regions being spatially continuous and having the same pixel value in the second foreground, a number of the second regions being equal to or greater than the predetermined number; and generating the intersection foreground including pixels of common coordinates among pixels in the first regions and pixels in the second regions.

The extracting the plurality of foregrounds may include: extracting a first foreground and a second foreground, and the generating the union foreground may include: determining first regions being spatially continuous and having the same pixel value in the first foreground, a number of the first regions being equal to or greater than a predetermined number; determining second regions being spatially continuous and having the same pixel value in the second foreground, a number of the second regions being equal to or greater than the predetermined number; and generating the union foreground including pixels in the first regions and pixels in the second regions.

According to an aspect of an exemplary embodiment, provided is a foreground generating apparatus including: one or more processors; one or more memories configured to store a computer program to be executed by the one or more processors, wherein the computer program, when executed by the one or more processors, causes the one or more processors to perform: extracting a plurality of foregrounds by applying a plurality of background models to an image, the plurality of background models having different ranges of a pixel variance value; generating an intersection foreground based on an intersection region among the extracted plurality of foregrounds; generating a union foreground based on a union region among each of the extracted plurality of foregrounds; and generating a final foreground based on the intersection foreground and the union foreground.

According to an aspect of an exemplary embodiment, provided is a non-transitory computer-readable storage medium that stores a computer program, which, when executed by a computing device, causes the computing device to perform: extracting a plurality of foregrounds by applying a plurality of background models to an image, the plurality of background models having different ranges of a pixel variance value; generating an intersection foreground based on an intersection region among the extracted plurality of foregrounds; generating a union foreground based on a union region among the extracted plurality of foregrounds; and generating a final foreground based on the intersection foreground and the union foreground.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
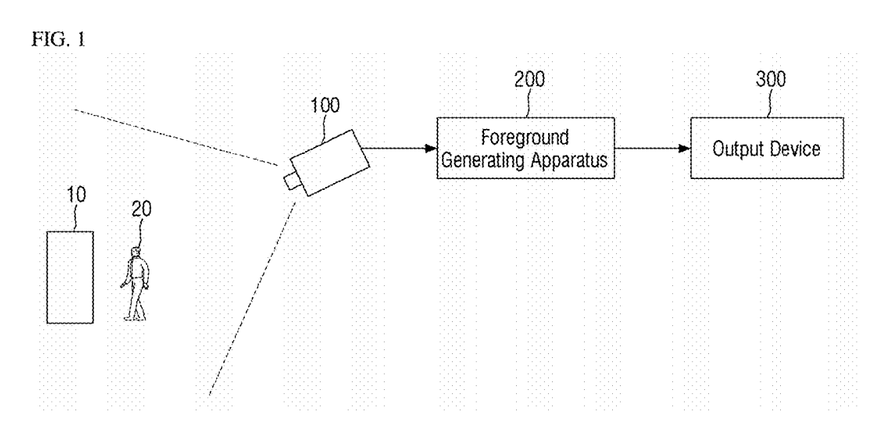
FIG. 1 is a diagram showing a configuration of a foreground generating system according to an embodiment of the present disclosure.

FIG. 1 is a diagram showing a configuration of a foreground generating system according to an embodiment of the present disclosure.

Referring to FIG. 1, a foreground generating system may include a sensor device 100, a foreground generating apparatus 200 and an output device 300.

The sensor device 100 is a device for receiving an image, and may be, for example, a CCTV camera for surveillance to detect a dynamic object. The sensor device 100 of the present disclosure is not limited thereto and may include an image acquisition device having a sensor responsive to at least one of visible light, infrared light and ultraviolet light.

The sensor device 100 may receive an image including a static object 10 and a dynamic object 20.

The foreground generating apparatus 200 may receive the acquired image from the sensor device 100. To this end, the foreground generating apparatus 200 is connected to the sensor device 100 in a wired or wireless manner.

The foreground generating apparatus 200 may be a computing apparatus capable of distinguishing between a foreground and a background in the provided image. For example, the foreground generating apparatus 200 may be an image analysis service providing apparatus.

According to an embodiment of the present disclosure, the foreground generating apparatus 200 may extract a plurality of foregrounds by applying multiple background models in parallel to an image provided at a specific time point from the sensor device 100.

The foreground generating apparatus 200 may perform intersection control on the extracted foregrounds to generate an intersection foreground. In addition, the foreground generating apparatus 200 may perform union control on the extracted foregrounds to generate a union foreground.

The foreground generating apparatus 200 may perform the intersection control and the union control in parallel. That is, in the foreground generating apparatus 200, an intersection foreground generation process and a union foreground generation process may be executed simultaneously.

The foreground generating apparatus 200 may generate a final foreground using the intersection foreground and the union foreground. The foreground generating apparatus 200 may provide the generated final foreground to the output device 300.

The specific configuration and operation of the foreground generating apparatus 200 will be described in detail below with reference to FIG. 2.

Meanwhile, in another embodiment of the present disclosure, the foreground generating apparatus 200 may perform a crime prevention function including a tracking function of tracking a final foreground after generating the final foreground. For example, the foreground generating apparatus 200 may identify, after generating the final foreground, an object corresponding to the generated final foreground in the image provided from the sensor device 100. Also, the foreground generating apparatus 200 may track the identified object. In this process, the foreground generating apparatus 200 may perform graphic processing on the identified object. For example, the foreground generating apparatus 200 may apply various graphic effects such as Border and Highlight to the identified object in order to visually distinguish the identified object from another object or background.

In this case, the foreground generating apparatus 200 may provide the output device 300 with an image to which a graphic effect for tracking the identified object is applied.

The foreground generating apparatus 200 may be a fixed or mobile terminal. Specifically, the foreground generating apparatus 200 may be any one of a server apparatus, a desktop personal computer (PC), a laptop computer, an Internet of Things (IoT) platform, a smart phone and a personal digital assistant (PDA).

The output device 300 is a device capable of receiving and displaying the extracted foreground from the foreground generating apparatus 200. In addition, the output device 300 may be provided with an image analysis service from the foreground generating apparatus 200.

To this end, the output device 300 may be connected to the foreground generating apparatus 200 in a wired or wireless manner.

The output device 300 may be, for example, a monitor or a TV. When the output device 300 is provided with an image analysis service, the output device 300 may be a terminal device including an image output unit such as a PC, a tablet, and a smart phone as a user terminal.

The sensor device 100, the foreground generating apparatus 200 and the output device 300 of FIG. 1 may be separately located in different spaces, but the embodiment of the present disclosure is not limited thereto. Two or more of the sensor device 100, the foreground generating apparatus 200 and the output device 300 may constitute one apparatus. For example, the foreground generating apparatus 200 and the output device 300 may be one component included in one apparatus.

Figure 2:
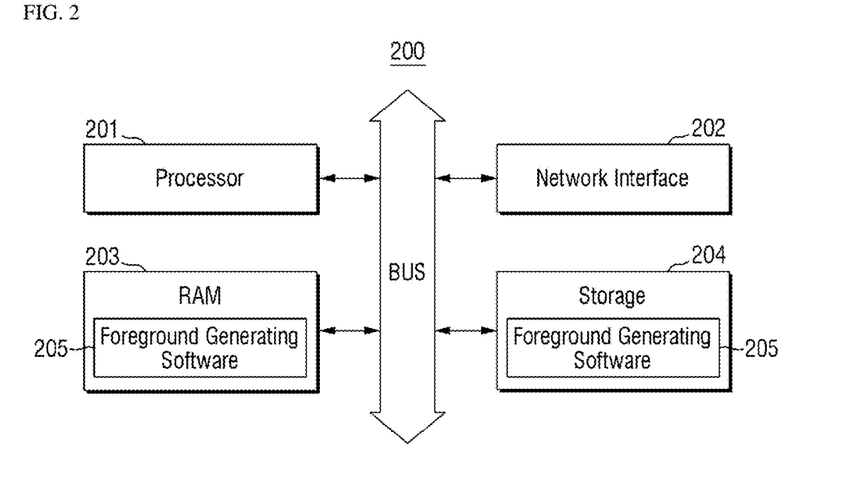
FIG. 2 is a block diagram of a foreground generating apparatus according to another embodiment of the present disclosure.

FIG. 2 is a block diagram of a foreground generating apparatus according to another embodiment of the present disclosure.

Hereinafter, the structure and operation of the foreground generating apparatus 200 will be described in detail with reference to FIG. 2.

Referring to FIG. 2, the foreground generating apparatus 200 may include at least one processor 201, a network interface 202 for communicating with an external device, a memory 203 for loading a computer program executed by the processor 201, and a storage 204 for storing a computer program. According to the embodiment of the present disclosure, the external device may be a fixed/mobile computing device as well as the sensor device 100 or the output device 300 shown in FIG. 1.

The processor 201 controls the overall operation of each component of the foreground generating apparatus 200. The processor 201 may be configured to include a Central Processing Unit (CPU), a Micro Processor Unit (MPU), a Micro Controller Unit (MCU), or any type of processor well known in the art. Also, the processor 201 may perform operations on at least one application or program to perform a method according to embodiments of the present disclosure. The foreground generating apparatus 200 may include one or more processors.

The network interface 202 supports wired/wireless communication of the foreground generating apparatus 200. Also, the network interface 202 may support various communication schemes well known in the art. To this end, the network interface 202 may be configured to include one or more communication modules well known in the art.

The network interface 202 may receive an image from the sensor device 100 shown in FIG. 1 via the network. Further, the network interface 202 may provide a foreground image to the output device 300. The network interface 202 may communicate with one or more devices in real time.

According to another embodiment of the present disclosure, the network interface 202 may provide an external device with a graphical user interface and service contents for using the image analysis service provided by the foreground generating apparatus 200.

The memory 203 stores various data, commands and/or information. The memory 203 may load at least one program 205 from the storage 204 to perform a service providing method according to embodiments of the present disclosure. In FIG. 2, a RAM is illustrated as an example of the memory 203.

The storage 204 may store the at least one program 205 non-temporarily. In FIG. 2, foreground generating software 205 is illustrated as an example of the at least one program 205.

The storage 204 may be configured to include a nonvolatile memory such as a read only memory (ROM), an erasable programmable ROM (EPROM), an electrically erasable programmable ROM (EEPROM) and a flash memory, a hard disk, a removable disk, or any type of computer-readable recording medium well known in the art.

The foreground generating software 205 may be executed by the processor 201 such that the foreground generating apparatus 200 generates a foreground using a multiple background model in which different variance value ranges (or different ranges of a pixel variance value) are set according to an embodiment of the present disclosure.

Alternatively, according to another embodiment of the present disclosure, the foreground generating software 205 may be executed by the processor 201 to provide an image analysis service using the generated foreground to an external device.

Meanwhile, although not shown, the foreground generating apparatus 200 may further include an input unit for receiving various settings required for generating a foreground according to an embodiment of the present disclosure. For example, the foreground generating apparatus 200 may receive a variance value range (or a range of a pixel variance value) of the background model through the input unit.

In another embodiment, the foreground generating apparatus 200 may receive, via the input unit, an input for setting the number of background models. The image received from the sensor device 100 is inputted to a background model to extract a foreground region. At this time, the foreground generating apparatus 200 may generate a plurality of background models according to the input set value. When a plurality of background models are generated, one identical image is inputted to each of the plurality of background models, and the foreground generating apparatus 200 extracts foregrounds using the plurality of background models, respectively. Thus, the same number of foregrounds as background models are extracted.

Also, the input unit may receive settings for variance value ranges applied to the plurality of background models through the input unit.

Figure 3:
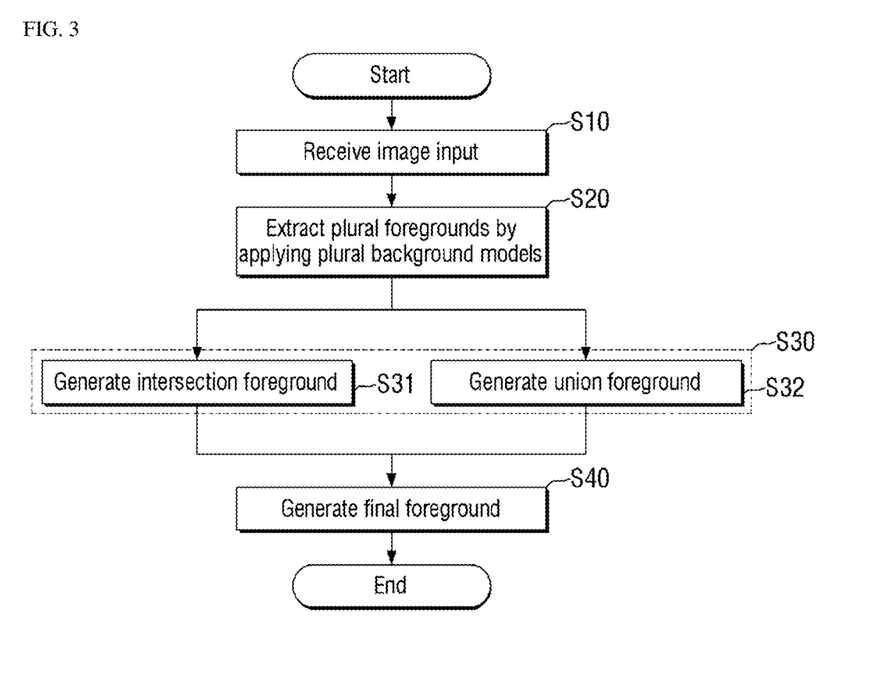
FIGS. 3 and 4 are flowcharts of a foreground generating method according to still another embodiment of the present disclosure.
Figure 4:
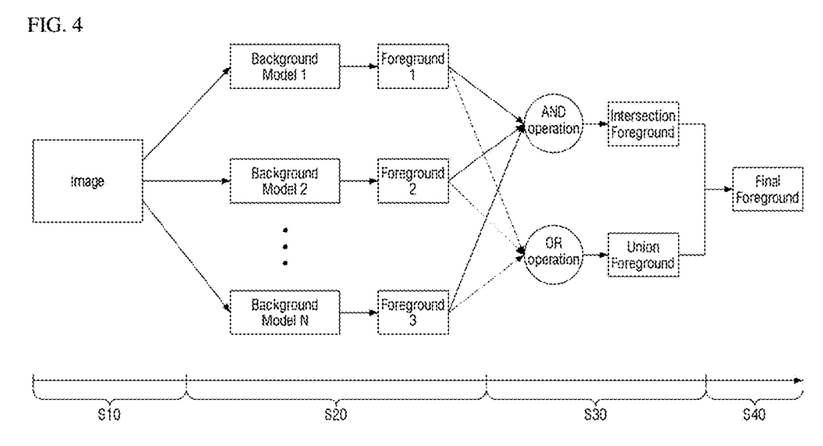

FIGS. 3 and 4 are flowcharts of a foreground generating method according to still another embodiment of the present disclosure.

Hereinafter, a case where each step included in the foreground generating method is performed by the foreground generating apparatus 200 will be described as an example. In particular, the foreground generating method is performed as the processor 201 executes operations in accordance with the foreground generating software 205.

Referring to FIGS. 3 and 4, the foreground generating apparatus 200 may receive the acquired image from the sensor device 100 (step S10).

The foreground generating apparatus 200 may extract a plurality of foregrounds by applying a plurality of background models having different variance value ranges to the received image (step S20).

As shown in FIG. 4, the foreground generating apparatus 200 may extract N foregrounds by applying N background models to the image. A case of applying a double background model having two background models will be described as an example. According to the embodiment of the present disclosure, the double background model means two background models having different variance value ranges. Alternatively, the double background model may mean two background models with different variance values.

In step S20, the foreground generating apparatus 200 may extract a first foreground using a first background model in which a first variance value range is set for the image, and extract a second foreground using a second background model in which a second variance value range is set for the image.

Referring to FIG. 4, an image is provided to each of a plurality of background models, and the foreground generating apparatus 200 extracts a plurality of foregrounds using a plurality of background models. At this time, an image may be provided at a time point t to each of the plurality of background models at the same time.

The foreground generating apparatus 200 may extract foregrounds in parallel for the respective background models using a plurality of background models.

Next, in step S30, the foreground generating apparatus 200 may perform intersection control on the extracted foregrounds to generate an intersection foreground (step S31), and perform union control on the extracted foregrounds to generate a union foreground (step S32).

Specifically, the foreground generating apparatus 200 may generate an intersection foreground of the extracted foregrounds through an AND operation or may generate an intersection foreground based on an intersection region among the extracted foregrounds (step S31). The foreground generating apparatus 200 may generate a union foreground of the extracted foregrounds through an OR operation or may generate a union foreground based on a union region among the extracted foregrounds (step S31).

There may be regions of pixels having the same pixel value, the number of which is equal to or greater than a predetermined number, on the foregrounds extracted through the background models having different variance value ranges. The foreground generating apparatus 200 may detect a common region for each foreground among these regions on the respective foregrounds. The detection process of the common region is referred to as intersection control. The foreground including the region detected by the intersection control is referred to as an intersection foreground. Thus, pixels having common coordinates among the pixels on the pixel region having the same pixel value detected by the foreground generating apparatus 100 for each foreground are included in the intersection foreground.

Further, the foreground generating apparatus 200 may detect all the regions of pixels having the same pixel value on the foregrounds. The foreground generating device 200 may sum up all the detected regions. A process of detecting and summing pixel regions having the same pixel value for each foreground is referred to as union control. The foreground including the region detected by the union control is referred to as a union foreground.

A case where the first foreground is extracted through the first background model and the second foreground is extracted through the second background model will be described as an example.

In the above example, region A and region B, which are pixel regions where pixels having the same pixel value are spatially continuous, may be included in the first foreground. Here, the pixel value may be a binary pixel value, but the embodiment of the present disclosure is not limited thereto. The pixel value may be various values such as an RGB value.

Further, region a and region C, which are pixel regions where pixels having the same pixel value are spatially continuous, may be included in the second foreground.

The foreground generating apparatus 200 may identify the region A and the region B on the first foreground. Further, the foreground generating apparatus 200 may identify the region a and the region C on the second foreground. The foreground generating apparatus 200 may identify the coordinates of the respective pixels included in the identified regions.

It is assumed that all the pixels included in the region a are included in the region A. The foreground generating apparatus 200 may identify an overlapping region between the region A on the first foreground and the region a on the second foreground. That is, the coordinates of the pixels of the region a on the second foreground are the same as the coordinates of the pixels of the region A on the first foreground, which are included in the overlapping region with the region a.

In such a case, the foreground generating apparatus 200 may generate a foreground including the region a as an intersection foreground through the intersection control of the first foreground and the second foreground. The foreground generating apparatus 200 may generate, as an intersection foreground, a foreground including pixels having the same coordinates.

On the other hand, it is assumed that the region C does not overlap the region A and the region B.

In this case, the foreground generating apparatus 200 may generate, as a union foreground a foreground including all the pixels included in the regions A, B and C through the union control.

The foreground generating apparatus 200 may perform the intersection control and the union control in parallel.

The foreground generating apparatus 200 may generate a final foreground based on the intersection foreground and the union foreground (step S40).

Figure 5:
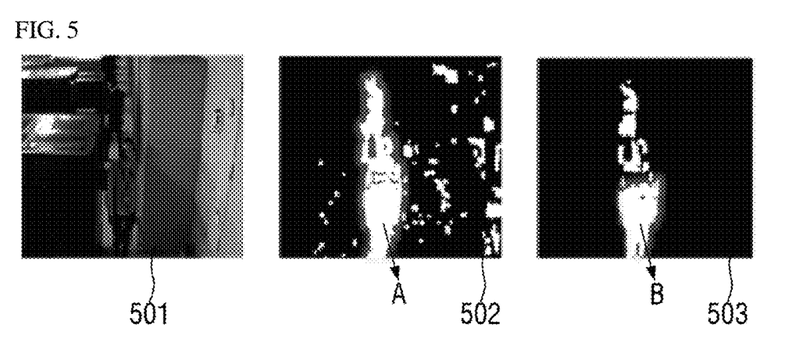
FIG. 5 is an exemplary diagram illustrating a multiple background model having different variance value ranges according to some embodiments of the present disclosure.

FIG. 5 is an exemplary diagram illustrating a multiple background model having different variance value ranges according to some embodiments of the present disclosure.

In FIG. 5, a case in which the foreground generating apparatus extracts two foregrounds by applying a double background model to an image 501 is illustrated as an example.

The image 501 includes a background and a foreground, and particularly includes, as the foreground, images of two people displayed at the lower and upper sides. The images of a person at the upper side and an upper body of a person at the lower side have a pixel value distribution similar to the background.

In the double background model, it is assumed that a first variance value range is set in the first background model and a second variance value range is set in the second background model. It is also assumed that the first variance value range is smaller than the second variance value range. For example, the first variance value range may be $2 \leq \sigma \leq 7$ ($\sigma$ is a variance value), and the second variance value range may be $9 \leq \sigma \leq 15$. In this case, for example, a first variance value may be 5 and a second variance value may be 10.

When the first background model is applied to the image 501, referring to image 502, not only foreground A but also the background of a peripheral portion was detected as the foreground. The upper side person image was detected relatively accurately even though it has a pixel value distribution similar to the background.

Further, when the second background model is applied to the image 501, referring to image 503, the noise of a background portion other than the foreground on the image 501 was excluded from foreground B, but a region of the upper side person image and the lower side person image was divided excessively, or some of the pixels in the foreground region were lost.

That is, as the set variance value range is smaller, the background model can more stably detect the foreground having a pixel value distribution similar to the background, but some pixels of the background portion may be erroneously detected and included in the foreground. On the other hand, as the set variance value range is larger, the background model can more stably detect the foreground even when there is a change in illumination or automatic settings of the sensor device, but the accuracy is lowered when detecting the foreground having a pixel value distribution similar to the background.

In a conventional foreground detection method, the foreground is detected by learning the background without considering the variance value range depending on the characteristics of the image. Accordingly, it has a problem that occurs depending on the above-described variance value range.

On the other hand, according to the embodiment of the present disclosure, since a multiple background model is used, a foreground can be extracted in consideration of both a foreground obtained when the variance value range is relatively large and a foreground obtained when the variance value range is relatively small. Specifically, according to the embodiment of the present disclosure, there is an advantage that the foreground generating apparatus 200 extracts a foreground corresponding to the variance values range separately for each of the multiple background models, and can finally extract a complementary foreground for each foreground extracted through the multiple background model.

Hereinafter, it is assumed that the first variance value is a variance value ($\sigma=5$) belonging to a predetermined first range ($2 \leq \sigma \leq 7$), and the second variance value is a variance value ($\sigma=10$) belonging to a predetermined second range ($9 \leq \sigma \leq 15$), and the maximum variance value ($\sigma=7$) in the first range is smaller than the minimum variance value ($\sigma=9$) in the second range.

Figure 6:
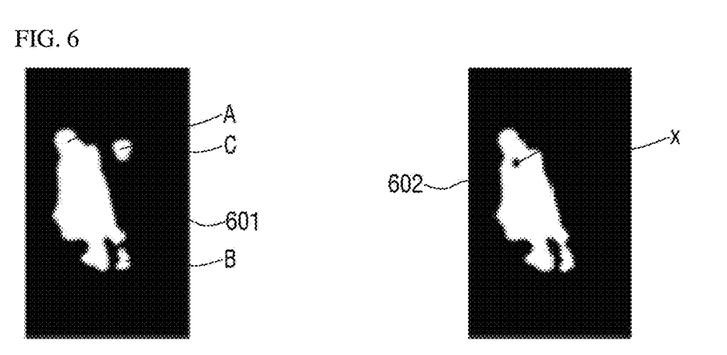
FIG. 6 is an exemplary diagram illustrating a foreground extracted from a multiple background model according to some embodiments of the present disclosure.

FIG. 6 is an exemplary diagram illustrating a foreground extracted from a multiple background model according to some embodiments of the present disclosure.

In FIG. 6, a case where an image 601 is extracted using the background model in which the variance value range is set to the first range and an image 602 is extracted using the background model in which the variance value range is set to the second range is illustrated as an example.

Referring to the image 601, the foreground includes regions A, B and C. Each region may be a separate object, or may be obtained by dividing an object.

Referring to the image 602, the foreground includes therein a pixel region X that has been lost.

According to the embodiment of the present disclosure, each of the background models in which the variance value ranges are set differently may determine the variance value through learning. The foreground generating apparatus 200 may extract a foreground with respect to the image provided at a current time point based on the determined variance value, and extract different foregrounds such as the image 601 and the image 602. The image 601 and the image 602 are obtained by using a background model with a relatively small variance value and a background model with a relatively large variance, respectively, and have the reliability that is not high.

The foreground generating apparatus 200 according to the embodiment of the present disclosure can improve the reliability of the foreground by generating an intersection foreground and a union foreground in step S30 and using them to generate a final foreground.

Hereinafter, the step S40 of generating the final foreground after generating the intersection foreground and the union foreground in step S30 will be described in detail.

Figure 7:
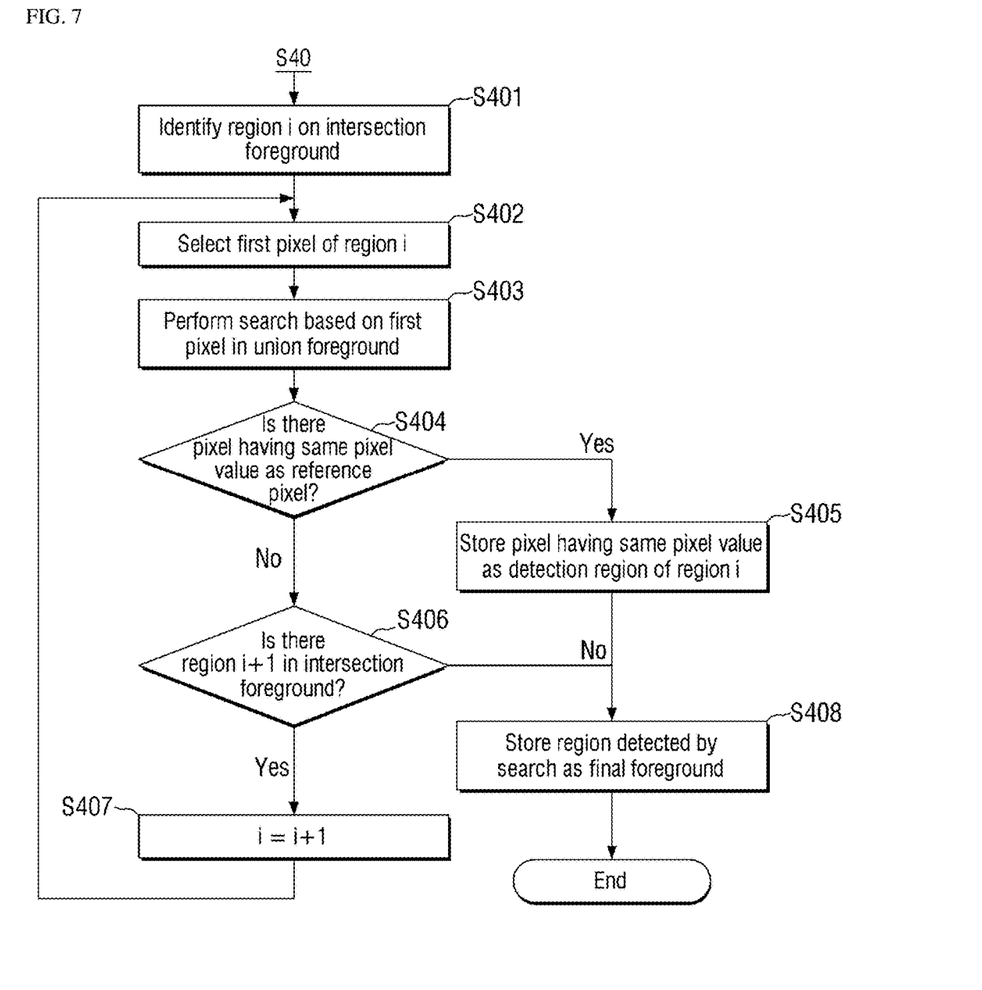
FIG. 7 is a flowchart illustrating a foreground generation process using an intersection foreground and a union foreground according to still another embodiment of the present disclosure.

FIG. 7 is a flowchart illustrating a foreground generation process using an intersection foreground and a union foreground according to still another embodiment of the present disclosure.

In step S40, the foreground generating apparatus 200 may identify at least one region on the intersection foreground (step S401). The intersection foreground may include one or more regions. When the intersection foreground includes a plurality of regions, the foreground may include a plurality of objects, but a plurality of regions may be extracted as one object is divided. As used herein, the term "regions" means spatially continuous pixel regions having the same pixel value. The foreground generating apparatus 200 may identify, as one region, spatially continuous pixel regions having the same pixel value, the number of which is equal to or greater than a predetermined number. The predetermined number is a minimum unit to be recognized as an object or one region of an object and may be determined by a manager of the foreground generating apparatus 100.

In this case, the foreground generating apparatus 200 may identify the regions having the same pixel value, for example, by identifying each pixel value of the generated intersection foreground. That is, after generating the intersection foreground through the intersection control, if a plurality of spatially contiguous regions having the same pixel value exist in the acquired image, the foreground generating apparatus 200 may identify them.

The foreground generating apparatus 200 may select a first pixel in a first region of the identified at least one region (step S402). The foreground generating apparatus 200 may select any pixel as the first pixel and select the first pixel according to preset criteria. At this time, the first pixel corresponds to a start point for starting a search for peripheral pixels on the union foreground. The foreground generating apparatus 200 may identify the coordinates of the selected first pixel.

The foreground generating apparatus 200 may perform a first search in a predetermined direction with respect to the peripheral pixels of the first pixel on the union foreground (step S403). Here, the first search means a search based on the first pixel.

At this time, for example, a flood fill algorithm may be used as a search method of the foreground generating apparatus 200.

For example, the foreground generating apparatus 200 performs a first search to find out whether there is a pixel having the same pixel value as the first pixel value in a predetermined order of forward, backward, leftward and rightward directions with respect to the peripheral pixels based on the coordinates of the first pixel.

The foreground generating apparatus 200 may determine whether a pixel having the same pixel value as the first pixel which is a reference pixel serving as a search reference exists in the first region (step S404). Accordingly, when a second pixel having the same pixel value as the pixel value of the first pixel is detected by the first search, the foreground generating apparatus 200 may detect the first pixel and the detected second pixel as pixels detected in the first region. The detected pixels are candidate pixels of the final foreground, and the foreground generating device 200 may store the detected pixels.

When the second pixel having the same pixel value as the first pixel exists in the adjacent region of the first pixel, the foreground generating apparatus 200 may identify the first pixel and the second pixel as spatially continuous regions.

As the second pixel having the same pixel value as the first pixel is searched, a region including the first pixel and the second pixel is generated. However, in order to finally determine the region, an additional search based on the second pixel is required. The shape of the region may be determined by the additional search.

The foreground generating apparatus 200 may perform a second search in a predetermined direction with respect to peripheral pixels of the second pixel. Here, the second search means a search based on the second pixel. The foreground generating apparatus 200 may determine whether a pixel having the same pixel value as the second pixel which is a reference pixel serving as a search reference exists in the first region (step S404). When a third pixel having the same pixel value as the pixel value of the second pixel is detected by the second search, the foreground generating apparatus 200 may determine the detected third pixel as a pixel detected in the first region.

Thus, the foreground generating apparatus 200 may identify a regions consisting of the first pixel, the second pixel and the third pixel as a spatially continuous region. The foreground generating apparatus 200 may determine the identified region as the detection region of the first region and store the determined detection region (step S405).

Meanwhile, after step S404, it may be determined whether or not the second region exists in addition to the first region in the intersection foreground (step S406). That is, it corresponds to a case where a plurality of regions are identified in step S401.

In this case, the foreground generating apparatus 200 may repeat a process of steps S402 to S406 of FIG. 7 with respect to the second region (step S407). Thus, the foreground generating apparatus 200 may select a first pixel in the second region in step S402. Here, the first pixel in the second region is a pixel having coordinate values different from those of the first pixel in the first region.

The foreground generating apparatus 200 may perform a search in a predetermined direction with respect to the peripheral pixels of the first pixel in the second region on the union foreground. When a pixel having the same pixel value as the pixel value of the first pixel in the second region is detected by the search, the foreground generating apparatus 200 may determine the first pixel in the second region and the detected pixel as pixels detected in the second region.

When a pixel having the same pixel value as that of the first pixel in the second region exists in an adjacent region of the first pixel in the second region, the foreground generating apparatus 200 may identify the first pixel in the second region and the pixel in the adjacent region as a spatially continuous region. The foreground generating apparatus 200 may determine the identified region as a detection region of the second region, and store the determined detection region (step S405).

Accordingly, the foreground generating device 200 may store a plurality of different detection regions as a region of the final foreground (step S408).

Figure 8:
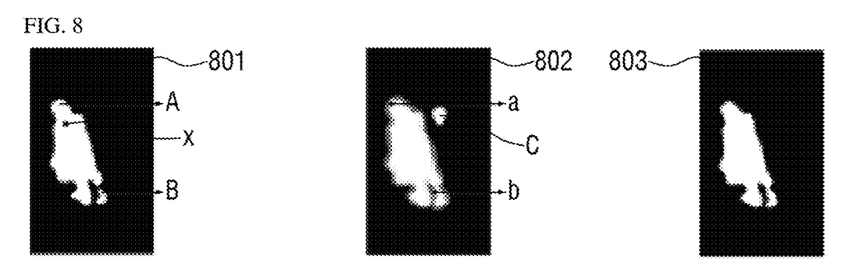
FIG. 8 is an exemplary diagram illustrating an intersection foreground, a union foreground and a final foreground according to some embodiments of the present disclosure.

FIG. 8 is an exemplary diagram illustrating an intersection foreground, a union foreground and a final foreground according to some embodiments of the present disclosure.

Referring to FIG. 8, an image 801 is an example of an intersection foreground of the image 601 and the image 602. When the foreground generating apparatus 200 uses a multiple background model, in step S20, the foreground generating apparatus 200 may extract the first foreground and the second foreground.

In step S30, the foreground generating apparatus 200 may generate a foreground including a common region between at least one region on the first foreground and at least one region on the second foreground.

That is, since a common region between regions A, B and C of the image 601 and the lost region X of the image 602 is the regions A and B and the lost region X, the foreground generating apparatus 200 may generate an intersection foreground such as the image 801.

An image 802 is an example of the union foreground of the image 601 and the image 602.

In step S40, the foreground generating apparatus 200 may generate a foreground including all of at least one region on the first foreground and at least one region on the second foreground. That is, the image 802 consists of all the regions of the image 601 and the image 602.

An image 803 is an example of the final foreground generated by performing the method of FIG. 7.

Referring to the image 803, the foreground generating apparatus 200 may determine first pixel a in the region A on the intersection foreground 801 and perform a search based on the first pixel a in the union foreground 802. Accordingly, all the pixels on the union foreground 802 connected to the region A on the intersection foreground 801 are stored as the final foreground region. Accordingly, the foreground generating apparatus 200 may store all the searched regions except the region C on the union foreground 802 as the final foreground regions.

At this time, a pixel corresponding to the lost region X on the intersection foreground 801 is also stored as a pixel of the final foreground. This is because the foreground generating apparatus 200 searches for a pixel having the same pixel value as the pixel value of the search pixel on the union foreground 802 and stores the pixel as a pixel of the final foreground. That is, since the pixel which has not been lost on the union foreground 802 has the same pixel value as the search pixel value, it is stored as a pixel of the final foreground irrespective of whether or not it has been lost on the intersection foreground 801.

Next, the foreground generating apparatus 200 may determine first pixel b in the region B on the intersection foreground 801 and perform a search based on the first pixel b in the region B on the union foreground 802. In this example, since a pixel corresponding to the region B in the intersection foreground 802 is stored as a pixel of the final foreground by the pixel search corresponding to the region A of the previous intersection foreground 802, it is not added as the final foreground.

Similarly, a region (hereinafter, referred to as a divided region) between the region A and the region B on the intersection foreground 801 also has the same pixel value without division of the region A and the region B in the union foreground 802. Therefore, the foreground generating apparatus 200 may store all the pixels of the divided region as pixels of the final foreground.

Meanwhile, the foreground generating apparatus 200 does not perform a search based on the pixel in the region C. Therefore, in the case of the region C on the union foreground 802, since the search pixel is selected in the region on the intersection foreground 801, the region C on the union foreground 802 is not detected as the final foreground.

The foreground generating apparatus 200 may generate a final foreground 803, which is an image including the region A, the region B and the divided region.

Figure 9:
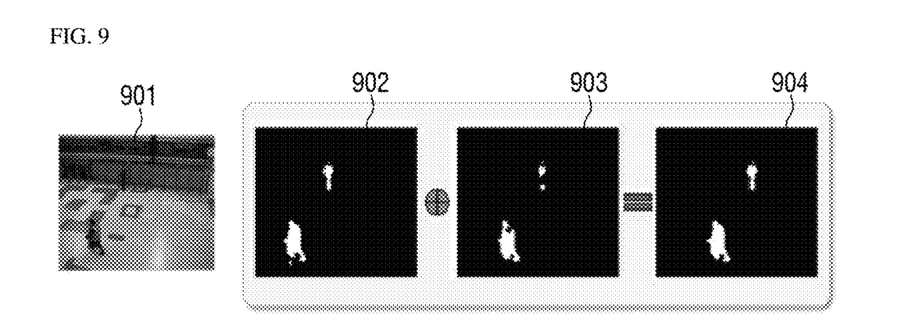
FIGS. 9 and 10 are exemplary diagrams for explaining a final foreground generation process for each input image according to some embodiments of the present disclosure.
Figure 10:
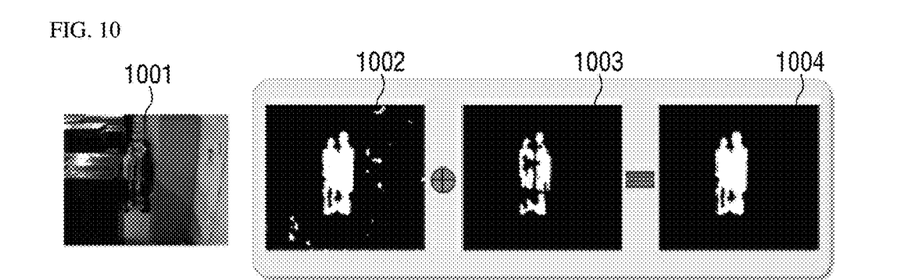

FIGS. 9 and 10 are exemplary diagrams for explaining a final foreground generation process for each input image according to some embodiments of the present disclosure.

Referring to FIG. 9, an image 901 includes, as an object, a person of a lower region and a person of an upper region having a pixel value distribution similar to the background. Referring to FIG. 10, an image 1001 includes, as an object, a right person and a left person having a pixel value distribution similar to the background.

In such a case, the foreground generating apparatus 200 may generate an intersection foreground and a union foreground of foregrounds 902 and 1002 extracted through a background model having a relatively low variance and foregrounds 903 and 1003 extracted through a background model having a relatively high variance, respectively, to generate final foregrounds 904 and 1004.

Referring to FIGS. 9 and 10, it can be confirmed that the detection accuracy of the final foregrounds 904 and 1004 is superior to that of the foregrounds 902 and 1002 and foregrounds 903 and 1003 with respect to an object having a pixel value distribution similar to the background.

Figure 11:
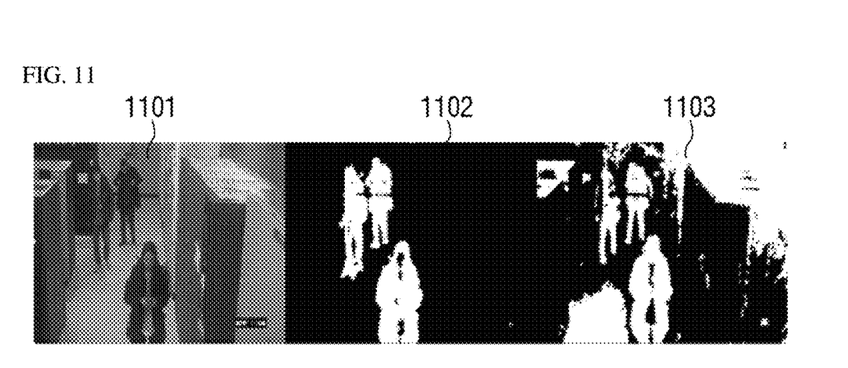
FIG. 11 is an exemplary diagram for explaining the accuracy of a final foreground according to some embodiments of the present disclosure.

FIG. 11 is an exemplary diagram for explaining the accuracy of a final foreground according to some embodiments of the present disclosure.

In FIG. 11, with respect to an image 1101, a final foreground 1102 generated according to the above-described embodiment and a foreground 1103 generated according to a conventional method are shown by way of example.

Referring to the image 1101, the image 1101 including three people may be obtained through the sensor device 100. At this time, when three people are identified as dark objects on the image 1101 and occupy a large portion of the image 1101, the sensor device 100 may activate a function of automatically adjusting a brightness value, thereby changing a background pixel value of an upper right region and an upper left region of the image 1101.

In this case, according to the embodiment of the present disclosure, the foreground generating apparatus 200 may generate the final foreground 1102. It can be confirmed that the final foreground 1102 includes the object extracted accurately as the foreground, while the foreground 1103 according to the conventional method includes an upper right region, an upper left region, a lower left region and the like, which correspond to the background.

So far, the method for generating a final foreground by the foreground generating apparatus 200 has been mainly described. According to an embodiment of the present disclosure, a multiple background model may be generated according to user settings. Hereinafter, this will be described in detail with reference to FIG. 12.

Figure 12:
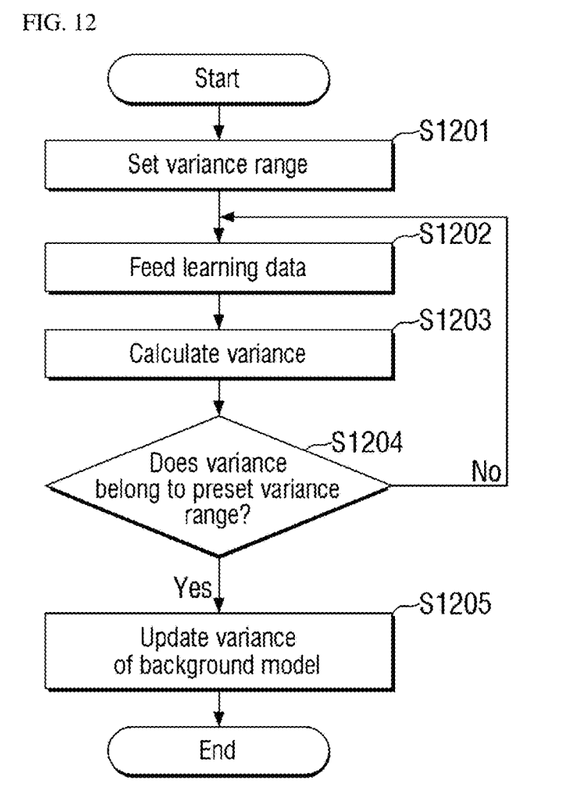
FIG. 12 is a flowchart of a method for determining a variance value to be applied to a background model according to still another embodiment of the present disclosure.

FIG. 12 is a flowchart of a method for determining a variance value to be applied to a background model according to still another embodiment of the present disclosure.

The foreground generating apparatus 200 may receive a setting number of 2 or more for the background models prior to step S20. For example, the setting number may be inputted through an input unit of the foreground generating apparatus 200 or an external device.

The foreground generating apparatus 200 may generate a plurality of background models based on the setting number. For example, a double background model may be generated when the setting number of 2 is inputted, and three background models may be generated when the setting number of 3 is inputted.

The foreground generating apparatus 200 may determine a variance value range to be set for each of the generated background models.

Specifically, the foreground generating apparatus 200 may determine a variance value range to be applied to each of the generated background models based on the setting number (step S1201).

For example, if the setting number is 2, two background models may be generated, and the foreground generating apparatus 200 may determine $2 \leq \sigma \leq 7$ and $9 \leq \sigma \leq 15$ as variance value ranges to be set for the respective background models. Alternatively, if the setting number is 3, three background models may be generated, and the foreground generating apparatus 200 may determine $2 \leq \sigma \leq 5$, $7 \leq \sigma \leq 10$ and $11 \leq \sigma \leq 15$ as variance value ranges to be set for the respective background models.

Next, the foreground generating apparatus 200 receives an image of the next time (step S1202).

The foreground generating apparatus 200 may continuously perform learning, and calculate a variance value at time point t by using a pixel value at the time point t and a pixel value average and a variance value at time point t−1 for each pixel of the image (step S1203).

The foreground generating apparatus 200 may determine whether the calculated variance value belongs to a variance value range determined for any one background model among the generated background models (step S1204). As a result of the determination, when the calculated variance value belongs to the variance value range determined for any one of the background models, the foreground generating apparatus 200 may determine the calculated variance value as a variance value of any one of the background models.

The foreground generating apparatus 200 may replace the previous variance value with the determined variance value for any one background model (step S1205). In other words, the foreground generating apparatus 200 may update the variance applied to the background model.

The foreground generating apparatus 200 may learn the background using the background model to which the updated variance is applied, extract the foreground, and adjust the variance according to the learning result. However, in this case, the foreground generating apparatus 200 may adjust the variance within the variance value range for the background model determined in step S1201.

For example, it is assumed that the variance value range of any one background model (hereinafter, referred to as background model 1) among the multiple background models is $2 \leq \sigma \leq 7$ ($\sigma$ is a variance value). If the variance value is 5 ($\sigma=5$), the variance value may become 7 ($\sigma=7$) as the foreground generating apparatus 200 adjusts the variance.

In this case, in order for the foreground generating apparatus 200 to extract a desired foreground according to learning, the variance may have to be continuously adjusted. That is, a background model when the variance value $\sigma$ is equal to or greater than 8 may be required for foreground extraction.

According to the embodiment of the present disclosure, in this case, the foreground generating apparatus 200 may extract a foreground corresponding to the variance using another background model. For example, the foreground generating apparatus 200 may extract a desired foreground using another background model (hereinafter, referred to as background model 2) in which the variance value range is set to $8 \leq \sigma \leq 15$ ($\sigma$ is a variance value).

Therefore, with respect to the background model 1, the foreground generating apparatus 200 may control the variance such that the variance value does not deviate from the range set for the background model 1 without increasing the variance any more.

The foreground generating apparatus 200 may execute the method of FIG. 12 in parallel for each of a plurality of background models.

The methods according to embodiments of the present disclosure described above with reference to the accompanying drawings can be performed by the execution of a computer program embodied in computer readable code. The computer program may be transmitted from a first computing device to a second computing device via a network, such as the Internet, installed in the second computing device, and thus can be used in the second computing device. The first computing device and the second computing device include all of a fixed computing device such as a server device and a desktop PC and a mobile computing device such as a laptop computer, a smart phone and a tablet PC.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for generating a foreground in a foreground generating apparatus, the method comprising:
   extracting a plurality of foregrounds by applying a plurality of background models to an image, the plurality of background models having different ranges of a pixel variance value;
   generating an intersection foreground based on an intersection region among the extracted plurality of foregrounds;
   generating a union foreground based on a union region among the extracted plurality of foregrounds; and
   generating a final foreground based on the intersection foreground and the union foreground.

2. The method of claim 1, wherein the extracting the plurality of foregrounds comprises:

extracting the plurality of foregrounds by applying, in parallel, the plurality of background models to the image.

3. The method of claim 1, wherein the different ranges of the pixel variance value include a first range of the pixel variance value and a second range of the pixel variance value, and wherein a maximum variance value belonging to the first range of the pixel variance value is smaller than a minimum variance value belonging to the second range of the pixel variance value.

4. The method of claim 1, further comprising:

receiving a setting number prior to extracting the plurality of foregrounds, the setting number being two or greater;

generating the plurality of background models based on the setting number; and determining a range of the pixel variance value to be set for each of the generated plurality of background models.

5. The method of claim 4, wherein the determining the range of the pixel variance value to be set for each of the generated plurality of background models comprises:

determining the range of the pixel variance value to be applied to each of the generated plurality of background models based on the setting number;

obtaining a pixel variance value at a time point (t) by using a pixel value at the time point (t) and a pixel value average and a pixel variance value at a time point (t−1) for each pixel of the image; and determining the obtained pixel variance value as a pixel variance value of one of the plurality of background models in response to the obtained pixel variance value belonging to the range of the pixel variance value determined for the one of the plurality of background models.

6. The method of claim 1, wherein the generating the final foreground comprises:

selecting a first pixel in a first region of the intersection foreground; and in response to detecting a second pixel having the same pixel value as a pixel value of the first pixel, among peripheral pixels of the first pixel in the union foreground, determining the first pixel and the second pixel as pixels of the final foreground.

7. The method of claim 6, further comprising:

in response to detecting a third pixel having the same pixel value as a pixel value of the second pixel, among peripheral pixels of the second pixel in the union foreground, determining the third pixel as a pixel of the final foreground.

8. The method of claim 6, further comprising:

selecting a fourth pixel in a second region of the intersection foreground; and in response to detecting a fifth pixel having the same pixel value as a pixel value of the fourth pixel, among peripheral pixels of the fourth pixel in the union foreground, determining the fourth pixel and the fifth pixel as pixels of the final foreground.

9. The method of claim 1, wherein the extracting the plurality of foregrounds comprises:

extracting a first foreground and a second foreground, and wherein the generating the intersection foreground comprises:

determining first regions being spatially continuous and having the same pixel value in the first foreground, a number of the first regions being equal to or greater than a predetermined number;

determining second regions being spatially continuous and having the same pixel value in the second foreground, a number of the second regions being equal to or greater than the predetermined number; and generating the intersection foreground including pixels of common coordinates among pixels in the first regions and pixels in the second regions.

10. The method of claim 1, wherein the extracting the plurality of foregrounds comprises:

extracting a first foreground and a second foreground, and wherein the generating the union foreground comprises:

determining first regions being spatially continuous and having the same pixel value in the first foreground, a number of the first regions being equal to or greater than a predetermined number;

determining second regions being spatially continuous and having the same pixel value in the second foreground, a number of the second regions being equal to or greater than the predetermined number; and generating the union foreground including pixels in the first regions and pixels in the second regions.

11. A foreground generating apparatus comprising:

one or more processors;

one or more memories configured to store a computer program to be executed by the one or more processors, wherein the computer program, when executed by the one or more processors, causes the one or more processors to perform:

extracting a plurality of foregrounds by applying a plurality of background models to an image, the plurality of background models having different ranges of a pixel variance value;

generating an intersection foreground based on an intersection region among the extracted plurality of foregrounds;

generating a union foreground based on a union region among the extracted plurality of foregrounds; and generating a final foreground based on the intersection foreground and the union foreground.

12. A non-transitory computer-readable storage medium that stores a computer program, which, when executed by a computing device, causes the computing device to perform:

extracting a plurality of foregrounds by applying a plurality of background models to an image, the plurality of background models having different ranges of a pixel variance value;

generating an intersection foreground based on an intersection region among the extracted plurality of foregrounds;

generating a union foreground based on a union region among the extracted plurality of foregrounds; and generating a final foreground based on the intersection foreground and the union foreground.

* * * * *